United States Patent
Anantharaman et al.

(10) Patent No.: US 6,767,397 B2
(45) Date of Patent: Jul. 27, 2004

(54) METHODS FOR PRODUCTION OF PIGMENT DISPERSION

(75) Inventors: Kalpathy R. Anantharaman, Cincinnati, OH (US); Michael L. Lewis, Union, KY (US); Pat Galioto, Cincinnati, OH (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 10/117,469

(22) Filed: Apr. 5, 2002

(65) Prior Publication Data

US 2003/0188664 A1 Oct. 9, 2003

(51) Int. Cl.$^7$ .................................................. C08K 5/00
(52) U.S. Cl. ........................ 106/493; 106/494; 106/499
(58) Field of Search ................................. 106/493, 496, 106/499

(56) References Cited

U.S. PATENT DOCUMENTS

| | | | |
|---|---|---|---|
| 4,474,473 A | | 10/1984 | Higuchi et al. ................ 366/75 |
| 6,273,599 B1 | * | 8/2001 | Affeldt et al. ............. 366/76.1 |
| 6,305,838 B1 | * | 10/2001 | Affeldt et al. ............. 366/349 |
| 6,348,091 B1 | * | 2/2002 | Affeldt et al. ............. 106/504 |
| 2003/0177939 A1 | * | 9/2003 | Robertson ................. 106/31.6 |

* cited by examiner

*Primary Examiner*—Anthony J. Green
(74) *Attorney, Agent, or Firm*—Sidney Persley

(57) ABSTRACT

Disclosed is a process for the preparation of a pigment dispersion starting with a tank flushed pigment that is continuously fed into a twin screw extruder, washed and dried by vacuum to get a desirable product.

7 Claims, No Drawings

METHODS FOR PRODUCTION OF PIGMENT DISPERSION

FIELD OF THE INVENTION

This invention relates to the production of pigment dispersion starting with a tank flushed pigment using the twin screw. This approach gives a lower conductivity and better dispersed material without affecting the throughput of the process.

BACKGROUND OF THE INVENTION

Conventional flush colors are made by using a Sigma blade mixer where the pigment presscake and the oleoresinous vehicle are mixed in the presence or absence of alkyds in portions to get a stiff paste. The water which breaks out during the process is decanted. The final stiff paste (flush) is dried under vacuum to eliminate the residual water. The dried product is then cut back with solvents, oil and the vehicle to make a standardized flush. This process is time consuming and requires heavy duty machines to accomplish the task. Further, it is a batch process and variation due to presscake quality, solids content of pigment and vehicle characteristics will result in wide variation in quality.

U.S. Pat. No. 4,474,473 illustrates a process to make pigment dispersions continuously using a twin screw co-rotating extruder wherein the hydrophobic liquid organic liquid media and the wet pigment presscake are fed into the extruder, and the pigment presscake is flushed and dehydrated continuously to obtain the pigment dispersion. The drawback of this process is the pigment presscakes used should be very high in solids content to achieve flushing. Further, the organic liquid media and the wet cake must be metered at proper rates to achieve flushing and dehydration. The other problem is that if the presscake is not washed well, there is no provision for washing in the process to reduce the conductivity of the resulting flush.

SUMMARY OF THE INVENTION

The present invention provides a process for the preparation of a pigment dispersion, said method comprising:
is (a) providing a twin screw extruder which comprises a pair of co-rotating parallel screws, a feed section, a dispersion section and a dehydrating section;
(b) feeding a tank flushed pigment into said feed section of the twin screw extruder and feeding a hydrophobic liquid organic media into the twin screw extruder;
(c) continuously flushing pigment particles from a water phase to an organic medium phase, thus forming a flushed pigment mixture; and
(d) transferring said flushed pigment mixture from said flushing section to said dehydrating section and therein continuously dehydrating said mixture by rotation of said pair of screws thereby forming pigment dispersion, wherein feeding the hydrophobic liquid organic media is done at any time prior to or after the dehydration of step.

DETAILED DESCRIPTION OF THE INVENTION

It has now surprisingly been found that using a tank flushed pigment (preflushed pigment) slurry or presscake when fed into a co-rotating extruder equipped with a feeding section, and multiple washing sections to achieve proper pH and conductivity levels, and a dehydrating section to remove the water, provides a method to make a consistent quality flush. The extruder can be equipped with sections to charge components to add prior to dehydration or after dehydration to get the desired rheology of the resulting flush.

The advantage of the process is that it can get a good dispersion of the pigment using the preflushed pigment or presscake. The rheology of the flush can be controlled by changing the process parameters.

Preferably, the twin screw extruder used in the present invention consists of 15 barrels (sections) with a feed section, 3 wash zones, 3 vent or vacuum zones and 1 discharge. The barrel sections are provided with water cooling and electric heating. The maximum screw speed of the extruder is 588 rpm and maximum power is 40 kW. The feeding of the preflushed material is preferably done using a K-Tron S60 feeder.

For the lithol rubine (C.I. Red 57) two kinds of preflush material were processed through the twin screw, the unwashed and washed preflush. For the unwashed material, the necessary washing was accomplished in the wash zones to reduce conductivity.

EXAMPLE 1

Lithol Rubine

A 6–7% concentrated rubine slurry was made in the conventional way. This slurry containing 41.6 parts of pigment was mixed with a composite of 87.1% modified hydrocarbon resin solution, 10.4% Magie 47 oil and 2.5% a solvent dipropylene glycol n-butyl ether (at 85° C. to get a preflush material having a composition of 41.6% pigment, 51.2% hydrocarbon resin solution, 6.1% Magie 47 oil and 1.5% solvent. The resultant preflush was filtered and used as it is for the unwashed trial and a portion of it was washed with water to get lower conductivity for the washed trial.

The unwashed lithol rubine preflush containing 41.2% pigment, 51.2% a modified hydrocarbon resin solution, 6.1% Magie 47 oil and 1.5% solvent as a wet material (60% solids and 40% water) was charged into a K-Tron feeder and fed to the twin screw feed hopper at a rate of 100 wet pounds/hour (60 dry pounds). The twin screw machine was run at 500 rpm. The washing of the flush was done using water and other ingredients in the washing zone. The product after washing was dried using vacuum in the barrels with vacuum and then dried by heating the drying zones. The discharge temperature was about 135–140° C. The pigment had converted to the bluer shade. Lower discharge temperature inhibits the conversion to bluer shade. The dried flush can be letdown by injecting the letdown materials in the twin screw or can be done separately in another tank. The discharge rate of the flush was about 60-65 dry pounds. The resultant flush was mixed with the necessary cutback materials and when tested versus standard was somewhat dark in mass tone, slightly yellower in shade, slightly high for gloss. The dispersion of the flush on the grind gauge test was good with only 2 scratches.

The above example was repeated using the washed preflush and obtained similar results. In this case, the washing was eliminated in the twin screw.

EXAMPLE 2

Diarylide AAA Yellow

A concentrated C.I. pigment yellow 12 slurry was made in a conventional way at 10–11% pigment. The resultant slurry containing 59.27 parts of pigment was mixed with a composite containing 90% hydrocarbon resin solution and 10% Magie 47 oil at 60–65° C. to form the preflush. The preflush so formed had a composition of 59.3% pigment, 36.7% hydrocarbon resin solution and 4.0% Magie 47 oil. Part of the preflush was filtered and washed with water to lower the conductivity and the other part was used as such in the trials in the twin screw.

The washed preflush material containing about 45% water and 55% solids were run through a K-Tron feeder at a rate of 100 we pounds per hour (55 dry pounds) into the twin screw feed hopper. The material was further washed in the wash zones with water to lower the conductivity further. The twin screw was run at rpm of 400. The product after washing was dried in the drying zones using vacuum. The product discharge temperature was 100–125° C. with no letdown material added after drying. This results in a more opaque product. The product after drying can be cooled by injecting the letdown materials like varnish, oils, etc. to get a product temperature of 65–70° C. The product made this way by adding additional letdown material was tested in the lab after completing the necessary material additions versus the standard. The product was considerably more darker and transparent with equal strength versus the standard. The dispersion on the grind gauge was good with no scratches.

The unwashed material when processed in the machine gave similar results after attaining the proper conductivity in the wash zones.

The invention has been described in terms of preferred embodiments thereof, but is more broadly applicable as will be understood by those skilled in the art. The scope of the invention is only limited by the following claims.

What is claimed is:

1. A process for the preparation of a pigment dispersion, said process comprising:

(a) providing a twin screw extruder which comprises a pair of co-rotating parallel screws, a feed section, a dispersion section and a dehydrating section;

(b) feeding a tank flushed pigment into said feed section of the twin screw extruder along with a hydrophobic liquid organic media;

(c) continuously flushing pigment particles from a water phase to an organic medium phase, thus forming a flushed pigment mixture; and (d) transferring said flushed pigment mixture from said dispersing section to said dehydrating section and therein continuously dehydrating said mixture by rotation of said pair of screws thereby forming pigment dispersion, optionally feeding additional hydrophobic liquid organic media at any time prior to or after step (d).

2. The method of claim 1, wherein said tank flushed pigment comprises a pigment, modified hydrocarbon resin solution and petroleum distillate.

3. The method of claim 1, wherein said hydrophobic liquid organic media is a mixture of from about 0.25 to 1.5 parts of water per 1 part of organic media by volume.

4. The method of claim 1, wherein said tank flushed pigment comprises a Lithol Rubine or Diarylide Yellow pigment.

5. The method of claim 2, wherein the method further comprises washing said tank flushed pigment with water.

6. The method of claim 2, wherein said tank flushed pigment comprises about 35 wt. % to about 60 wt. % of pigment.

7. The method of claim 6, wherein said tank flushed pigment comprises about 40 wt. % to about 50 wt. % of pigment.

* * * * *